UNITED STATES PATENT OFFICE.

CHARLES J. REED, OF PHILADELPHIA, PENNSYLVANIA

PROCESS OF ROASTING ORES AND RECOVERING ZINC THEREFROM.

1,069,179.  Specification of Letters Patent.  Patented Aug. 5, 1913.

No Drawing.  Application filed June 3, 1912.  Serial No. 701,300.

*To all whom it may concern:*

Be it known that I, CHARLES J. REED, a citizen of the United States, residing at Philadelphia, in the county of Philadelphia and State of Pennsylvania, have invented certain new and useful Improvements in Processes of Roasting Ores and Recovering Zinc Therefrom, of which the following is a specification.

My process relates to the conversion of sulfid ores into sulfates, and the recovery of the metals from the sulfates by solution in water and acid. It is particularly adapted to the treatment of mixed sulfids of zinc, iron, manganese, lead, copper, cadmium and other metals, containing or not containing gold or silver or both. In the ordinary process of roasting such ores, it is customary not to grind the ore to a very small size, and to avoid as much as possible the production of fine dust. The granular ore is gradually raised to a high temperature in contact with air, and is stirred continuously or at frequent intervals, the final temperature being a bright red, nearly a white heat. In this process only a small percentage of sulfid is converted into sulfate, most of it being converted into oxid, with the burning out of sulfur and the production of sulfur dioxid, which escapes.

In my process the ore is first ground to a very fine powder or dust, the finer the better. I find it advantageous to reduce it to a size that will pass through a screen having 150 or 200 holes to the linear inch. The ore is then thoroughly mixed with a suitable quantity of a suitable metallic oxid, such as zinc oxid or iron oxid, also reduced to a state of minute subdivision. The mixture of ore and oxid is then heated in contact with air for several hours, at a dull red heat, until there is no further chemical change. The soluble sulfate is then dissolved out with water. There will also generally be simultaneously produced a quantity of basic sulfate and sulfite, which may be dissolved by dilute or moderately-concentrated acid but not by water alone. The zinc, copper, cadmium and some of the other metals may in this manner be easily obtained in solution, from which the various metals may be separately or collectively recovered, either by electrolytic or other methods of precipitation.

I do not limit myself to the use of the particular oxids herein mentioned, since others may serve the same purpose. A convenient and efficient oxid reagent is the previously-roasted and leached ore-residue, consisting chiefly of iron oxid.

While I do not limit myself to any particular proportions in the mixture of ore and oxids, one part by weight of oxid to two parts of ore is found to be efficient, although almost any proportion may be used to produce a result of the same general character.

I do not limit myself to any particular method of recovering the metal from the solution, but prefer, in the case of zinc, to deposit the metal electrolytically, using an anode of spongy lead, which electrochemically binds the liberated sulfuric acid. In this case, I first purify the solution by treating it with oxidizing agents, zinc oxid and metallic zinc, as described in another application filed simultaneously herewith.

I claim:—

1. The process of treating metallic sulfids, which consists in reducing them to a fine powder, mixing the powder with a material containing a metallic oxid, and subjecting the mixture to heat in the presence of an oxygen containing fluid.

2. The process of recovering metals from metallic sulfids, which consists in reducing them to a fine powder, mixing the powder with a metallic oxid, subjecting the mixture to the joint action of heat and an oxygen containing fluid, dissolving out the resulting sulfate, and recovering the metal from the solution.

3. The process of recovering zinc from zinc sulfid, which consists in heating the pulverized material, mixed with a metallic oxid, in air, dissolving out the resulting compounds, and recovering zinc from the solution.

4. The process of recovering zinc from zinc sulfid, which consists in heating the powdered material, mixed with a previously-oxidized portion of similar material, in an oxidizing atmosphere, dissolving out the resulting compounds, and recovering zinc from the solution.

In testimony whereof I affix my signature in presence of two witnesses.

CHARLES J. REED.

Witnesses:
 FRANK A. LEACH,
 J. M. JACKSON.

---

Copies of this patent may be obtained for five cents each, by addressing the "Commissioner of Patents. Washington, D. C."